United States Patent [19]
Miura

[11] Patent Number: 5,826,701
[45] Date of Patent: Oct. 27, 1998

[54] CONVEYOR GUIDE RAILS

[75] Inventor: Shinya Miura, Yawara-mura, Japan

[73] Assignee: SMC Corporation, Tokyo, Japan

[21] Appl. No.: 661,328

[22] Filed: Jun. 13, 1996

[30] Foreign Application Priority Data

Jul. 13, 1995 [JP] Japan ................................ 7-200457

[51] Int. Cl.$^6$ .................................................. B65G 35/00
[52] U.S. Cl. ..................... 198/619; 198/805; 104/156; 104/138.1
[58] Field of Search ................................. 198/619, 805, 198/860.2; 104/119, 138.1, 138.2, 155, 156, 161

[56] References Cited

U.S. PATENT DOCUMENTS 5,537,929 7/1996 Miura et al. .......................... 198/619

FOREIGN PATENT DOCUMENTS 59-34884 8/1984 Japan .

Primary Examiner—William E. Terrell
Assistant Examiner—Mark Deuble
Attorney, Agent, or Firm—Oblon, Spivak, McClelland, Maier & Neustadt, P.C.

[57] ABSTRACT

A hollow guide rail 10 defining a pneumatic cylinder tube which is made up of multiple tubular members 16 connected in end to end fashion. Each tubular member 16 has a reinforcing rib 17 extending between its opposite ends, a rib-less part 24 formed on the tubular member 16 near each of its longitudinal ends by cutting away a part of the reinforcing rib 17, and a coupling rib 25 defined by the portion of the reinforcing rib 17 which remains between each rib-less portion 24 and the nearest longitudinal end of the tubular member 16 after the portions of the reinforcing rib 17 have been cut away. The tubular members 16 are connected to each other by fastening the coupling ribs 25 of adjacent tubular members 16 together with connecting plates 33 fitted over the coupling ribs and nuts and bolts 34.

7 Claims, 3 Drawing Sheets

5,826,701

CONVEYOR GUIDE RAILS

FIELD OF THE INVENTION

This invention relates to guide rails of conveyors using rod-less cylinders that double as cylinder tubes.

DESCRIPTION OF THE PRIOR ART

A conveyor of this type that uses a rod-less cylinder generally comprise a hollow guide rail that doubles as a cylinder tube, a piston slidably fitted in the guide rail, a moving element slidably fitted over the guide rail, and magnet couplings that magnetically connect the piston and moving element. The piston is moved by compressed air or other fluid pressure and the moving element moving therewith conveys an article.

The guide rail has an axially extending rib that serves both as a fitting to fasten the guide rail to a base and a reinforcement. Usually, multiple tubular members having a rib are axially joined together to form a straight or a curved continuous guide rail line.

Japanese Patent Publication No. S59-34884 (1984) discloses a conveyor guide rail made of tubular members that are provided with a rib as described above. As schematically shown in FIG. 7, this guide rail is formed by joining together tubular members 1 and 2, each of which has an axially extending rib 3 on the outer periphery thereof by fitting together stepped ends 4 and 5. The joined stepped ends are fastened with multiple set screws 8. Clamping plates 6 are placed on both sides of the ribs 3 so as to extend over the ribs on both tubular members and fastened with bolts and nuts 7.

However, the tubular members 1 and 2 provided with a rib 3 are in many cases very difficult to join together.

This difficult arises from the very high rigidity (moment of inertia of the cross section) of the ribbed tubular members. If the axes of adjoining tubular members to be joined together slant to each other or twist therearound, mating of the adjoining ribs is difficult to achieve because the displacement is difficult to correct. This problem is likely to arise particularly when tubular members used in forming curved guide rail lines are curved with insufficient accuracy or twist around the axes thereof.

SUMMARY OF THE INVENTION

The object of this invention is to provide a guide rail of a conveyor with a rod-less cylinder in which adjoining tubular members can be easily and securely joined together even when the adjoining tubular members incline to each other or twist around the axes thereof to some extent.

To achieve the above object, a guide rail of this invention comprises tubular members that are smoothly joined together so that no step is formed either inside or outside. Each tubular member has an axially extending rib provided as fitting and reinforcing means, a coupling rib provided at an end of the tubular member as an extension of the rib, and a rib-less part provided between the coupling rib and the rib to decrease the rigidity of the tubular member. Adjoining tubular members are joined together, with the adjoining ends butted together and the coupling ribs fastened to each other.

The rib-less part decreases the rigidity of each end of each tubular member in the guide rail. Even if any tilt or twist around the axis arises when two tubular members are joined together, therefore, the resulting displacement can be easily corrected and the two tubular members are properly butted together. Thus all tubular members can be put together easily and securely. Also, curved guide rail lines can be formed with relative ease because the rib-less part absorbs or correct, to some extent, the twist that may arise when tubular members are curved.

The rib-free part is provided by removing part of the rib, whereas the coupling rib is provided at the butt end of a tubular member on the outside of the rib-less part.

In a preferred embodiment of this invention, adjoining tubular members are fastened end to end and joined tightly together by means of a sleeve extending over both tubular members.

In another preferred embodiment of this invention, adjoining tubular members are lapped, with the internally indented end of one member whose inside diameter is larger than that of the rest of the same member placed over the externally indented end of the other member whose outside diameter is smaller than that of the rest of the same member, and joined tightly together.

Adjoining tubular members according to this invention are fastened together by two fastening plates extending over the coupling ribs of the two tubular members and bolts and nuts that fasten the fastening plates in place, or a an axial groove provided in the farthest end of the coupling rib of each tubular member, a coupling bolt passed through the axial grooves in the coupling ribs, of the adjoining tubular member and nuts to fasten the coupling bolt in place, or both.

BRIEF DESCRIPTION OF THE INVENTION

DETAILED DESCRIPTION OF THE INVENTION

Figure 1:
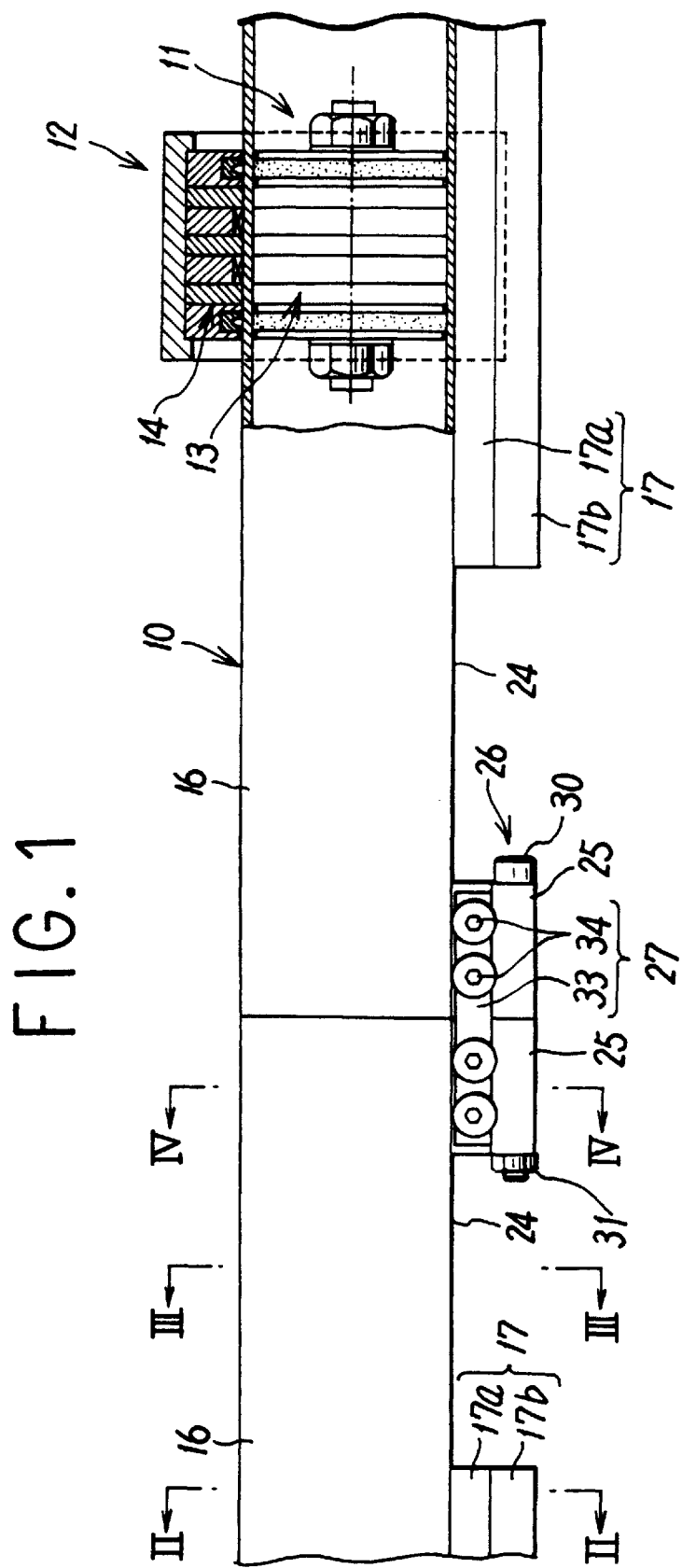
FIG. 1 is a elevation of a first embodiment of this invention, with a part thereof cut open.

FIG. 1 shows a conveyor guide rail according to this invention. This conveyor guide rail comprises a hollow guide rail 10 doubling as a cylinder tube, a piston 11 slidably fitted in the guide rail 10, a moving element 12 slidably fitted over the guide rail 10, and magnet couplings 13 and 14 that magnetically connect the piston 11 and moving element 12. The guide rail 10 is mounted on a base not shown and fixed in place.

Compressed air or other fluid pressure supplied into the guide rail 10 moves the piston 11, whereby the moving element 12 moves along with the piston 11 and moves an article to be transported.

Here no detailed descriptions of the piston 11, moving element 12 and magnet couplings 13 and 14 are given because they are of known type.

Figure 2:
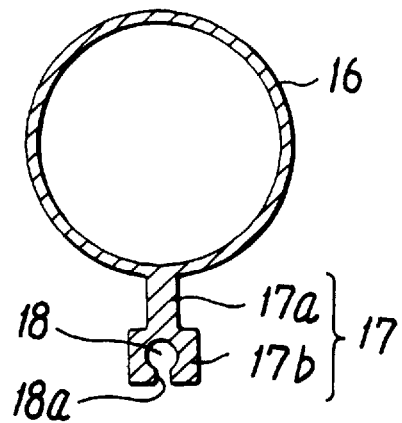
FIG. 2 is a cross-sectional view taken along the line II—II of FIG. 1.

The guide rail 10 is made up of multiple tubular members 16 that are joined together in such a manner that the inner and outer surfaces thereof are smooth enough to provide no obstacles to the movement of the piston 11 and moving element 12. Each tubular member 16 has a circular cross-section as shown in FIG. 2 and a rib 17 that is provided on the outer surface thereof so as to extend axially over the entire length of the tubular member. The tubular members having this rib 17 are integrally made by extrusion of aluminum or other non-magnetic materials.

The rib 17 serves both as means for fitting the guide rail 10 to a base (not shown) and means for reinforcing the guide rail 10 itself. The rib 17 comprises a main part 17a that extends radially outward, a broader part 17b having a rectangular cross-section provided at the farthest end of the main part 17a and a circular axially extending groove 18 provided in the broader part 17b. The groove 18 has a narrow opening 18 that opens to the outside at the outer end of the broader part 17b.

Adjoining tubular members 16 are tightly connected to each other as described below.

Figure 5:
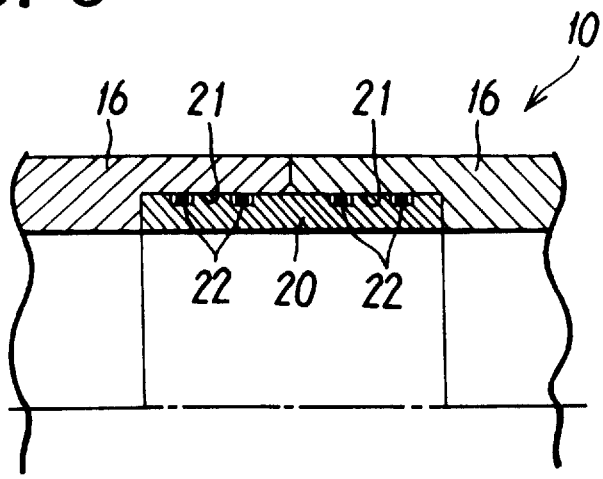
FIG. 5 is a cross-sectional view enlarging the principal parts of FIG. 1.

A stepped part 21 having a larger inside diameter is provided at each end of each tubular member 16 to accommodate a sleeve therein, as shown in FIG. 5. A sleeve 20 is fitted to extend over two stepped parts 21 of adjoining tubular members 16. Sealing materials are provided between the outer surface of the sleeve 20 and the inner surface of the stepped parts of the tubular members 16. The height of the stepped part 21 and the thickness of the sleeve 20 must be exactly the same so that the inner surface of the sleeve 20 is flush with that of the tubular members 16.

Figure 3:
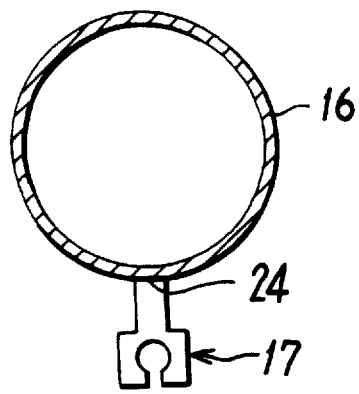
FIG. 3 is a cross-sectional view taken along the line III—III of FIG. 1.

As can be seen in FIGS. 1 and 3, a coupling rib 25 lying on the extension of the rib 17 is provided at the butt end of each tubular member 16. A rib-less part 24 to decrease the rigidity of the tubular member 16 is provided between the coupling rib 25 and the rib 17. The coupling ribs 25 of the adjoining tubular members are fastened together.

The rib-less part 24 is provided by cutting away a part of the rib 17 that extends over the entire length of the tubular member 16. Actually, the coupling rib 25 is the remainder of the rib 17 that is left over at the butt end of the tubular member 16 after the rib-less part 24 has been provided. Accordingly, the coupling rib 25 and the rib 17 have the same cross-sectional shape.

However, the coupling rib 25 does not always have to have the same cross-sectional shape as the rib 17. The coupling rib 25 and the rib 17 may have different cross-sectional shapes if adjoining tubular members 16 can be joined together without offering any obstacle to the movement of the moving element mentioned before.

Figure 4:
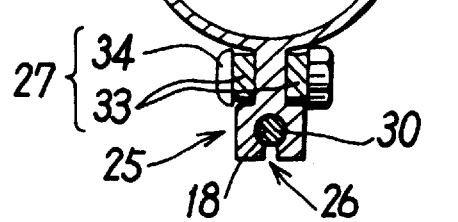
FIG. 4 is a cross-sectional view taken along the line IV—IV of FIG. 1.

A device for fastening together the adjoining coupling ribs 25 comprises a first fastening means 26 and a second fastening means 27. As shown in FIGS. 1 and 4, the first fastening means comprises a coupling bolt 30 passed through the grooves 18 provided in the coupling ribs 25 and a nut 31 that secures the coupling bolt 30. The second fastening means comprises a pair of plates 33 that are fitted over and on both sides of the adjoining coupling ribs 25 and bolts and nuts 34 that fasten the plates 33. While the coupling ribs 25 in the illustrated embodiment are fastened with both of the first and second fastening means 26 and 27, either one of them may be used instead of both.

Some tilt or axial twist may arise when adjoining tubular members 16 are tightly joined together by using the sleeve 20 or fastening together the coupling ribs 25 with the fastening means described before. Because the rigidity in the butt end of each tubular member 16 is decreased by the provision of the rib-less part 24, however, the adjoining tubular members can be correctly aligned by easily correcting the displacement resulting from such tilt or axial twist. This assures simple and secure connection of adjoining tubular members with the sleeve or the coupling ribs 25.

Even in the use of curved tubular members 16 to form a curved guide rail line 10, the reduced rigidity due to the provision of the rib-less part 24 permits preventing the occurrence of unwanted twist to a considerable extent. Any twist that has arisen unavoidably can be corrected with relative ease.

The axial length of the rib-less part 24 should be long enough to decrease the rigidity of the tubular member 16 but preferably kept to a minimum. At least, the rib-less part 24 must be long enough to allow the insertion of the coupling bolt 30 in the grooves 18 in the coupling ribs 25.

Figure 6:
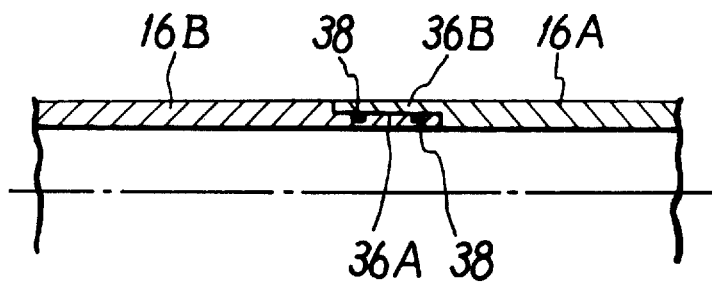
FIG. 6 is a cross-sectional view showing the principal parts of a second embodiment of this invention.
Figure 7:
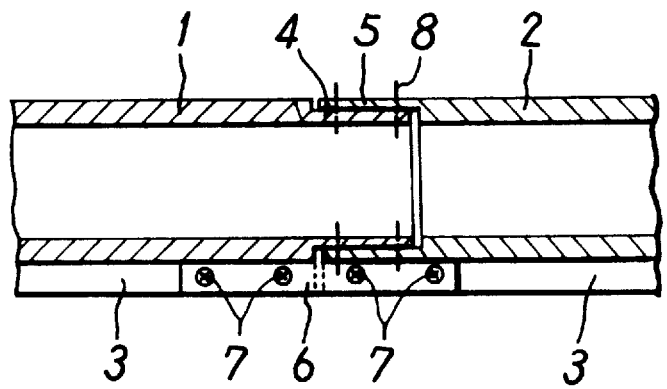
FIG. 7 is a cross-sectional view showing the principal parts of a conventional guide rail.

FIG. 6 shows another embodiment in which adjoining tubular members are tightly joined together. The butt ends of the adjoining tubular members shown here are directly joined together without using a sleeve 20 of the type shown in FIG. 5. One tubular member 16A has an internally indented end 36A whose inside diameter is larger than that of the rest of the same member, while the other tubular member 16B has an externally indented end 36B whose outside diameter is smaller than that of the rest of the same member. The two tubular members 16A and 16B are tightly joined together by fitting the internally intended end 36A over the externally intended end 36B with a sealing material 38 placed therebetween.

The tubular members 16A and 16B are also fastened together by the coupling means shown in FIGS. 1 and 4.

What is claimed is:

1. In a conveyor comprising a hollow guide rail doubling as a cylinder tube, a piston slidably fitted in the guide rail, a moving element slidably fitted over the guide rail, and magnet couplings magnetically connecting the piston and moving element, the improvement that:

the guide rail comprises multiple tubular members that are joined together in such a manner that the inner and outer surfaces thereof lie flush enough to offer no obstacle to the movement of the piston and moving element;

each tubular member has a continuous axially extending fitting and reinforcing rib, a coupling rib provided as an extension of said rib at the butt end of the tubular member, and a rib-less part provided between the rib and the coupling rib to decrease the rigidity of the tubular member; and adjoining tubular members are joined together end to end by fastening together the coupling ribs thereon.

2. The improvement according to claim 1, in which:

the rib-less part is provided by cutting away a part of the rib and the coupling rib is the remainder of the rib left over at the butt end of the tubular member after the rib-less part has been provided.

3. The improvement according to claim 1, in which:

adjoining tubular members are tightly joined together by means of sleeve fitted over the two tubular members.

4. The improvement according to claim 1, in which:

adjoining tubular members are tightly joined together by fitting an internally indented end of one tubular member over an externally intended end of the other tubular member, the internally intended end having a larger inside diameter than the rest of the same tubular member and the externally intended end having a smaller outside diameter than the rest of the same tubular member.

5. The improvement according to any of claims 1 to 4, further comprising:

a fastening means, the fastening means comprising a pair of fastening plates fitted over the coupling ribs of adjoining tubular members and bolts and nuts to secure the fastening plates in place.

6. The improvement according to any of claims 1 to 4, in which:

the coupling ribs each have a groove formed therein, and comprises a coupling bolt that is passed through the grooves in the coupling ribs of adjoining tubular members and a nut to secure the coupling bolt.

7. The improvement according to any of claims 1 to 4, in which:

the fastening means comprises a pair of fastening plates fitted over the coupling ribs of adjoining tubular members and bolts and nuts to secure the fastening plates in place, and a coupling bolt that is passed through the grooves in the coupling ribs of adjoining tubular members and a nut to secure the coupling bolt.

* * * * *